(12) United States Patent
Speier et al.

(10) Patent No.: US 11,119,770 B2
(45) Date of Patent: Sep. 14, 2021

(54) PERFORMING ATOMIC STORE-AND-INVALIDATE OPERATIONS IN PROCESSOR-BASED DEVICES

(71) Applicant: Microsoft Technology Licensing, LLC, Redmond, WA (US)

(72) Inventors: Thomas Philip Speier, Wake Forest, NC (US); Eric Francis Robinson, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/522,755

(22) Filed: Jul. 26, 2019

(65) Prior Publication Data

US 2021/0026636 A1    Jan. 28, 2021

(51) Int. Cl.
*G06F 9/30* (2018.01)
*G06F 12/0875* (2016.01)

(52) U.S. Cl.
CPC ...... *G06F 9/30087* (2013.01); *G06F 9/30043* (2013.01); *G06F 12/0875* (2013.01)

(58) Field of Classification Search
None
See application file for complete search history.

(56) References Cited

U.S. PATENT DOCUMENTS 4,885,680 A * 12/1989 Anthony ............. G06F 12/0891
                                                711/144
5,276,852 A * 1/1994 Callander ........... G06F 12/0831
                                                711/143
5,860,111 A * 1/1999 Martinez, Jr. ....... G06F 12/0804
                                                711/121

(Continued)

OTHER PUBLICATIONS

"AMD64 Technology AMD64 Architecture Programmer's Manual vol. 1: Application Programming", Retrieved From https://developer.amd.com/wordpress/media/2012/10/24592_APM_v11.pdf, May 31, 2013, 386 Pages.

(Continued)

*Primary Examiner* — Eric Coleman
(74) *Attorney, Agent, or Firm* — Withrow & Terranova, PLLC

(57) ABSTRACT

Performing atomic store-and-invalidate operations in processor-based devices is disclosed. In this regard, a processing element (PE) of one or more PEs of a processor-based device includes a store-and-invalidate logic circuit used by a memory access stage of an execution pipeline of the PE to perform an atomic store-and-invalidate operation. Upon receiving an indication to perform a store-and-invalidate operation (e.g., in response to a store-and-invalidate instruction execution) comprising a store address and store data, the memory access stage uses the store-and-invalidate logic circuit to write the store data to a memory location indicated by the store address, and to invalidate an instruction cache line corresponding to the store address in an instruction cache of the PE. The operations for storing data and invalidating instruction cache lines are performed as one atomic store-and-invalidate operation, such that the store-and-invalidate operation is considered successful only if both the store and invalidate operations are successful.

20 Claims, 9 Drawing Sheets

(56) References Cited

U.S. PATENT DOCUMENTS

| | | | | |
|---|---|---|---|---|
| 5,890,217 A * | 3/1999 | Kabemoto | .......... | G06F 12/0817 |
| | | | | 711/120 |
| 6,412,043 B1 * | 6/2002 | Chopra | .............. | G06F 9/30032 |
| | | | | 711/118 |
| 6,728,839 B1 * | 4/2004 | Marshall | ............ | G06F 12/0862 |
| | | | | 711/137 |
| 2009/0157981 A1 | 6/2009 | Kinter et al. | | |
| 2011/0055469 A1 * | 3/2011 | Natu | .................. | G06F 9/30101 |
| | | | | 711/105 |
| 2014/0025891 A1 * | 1/2014 | McCormack | ....... | G06F 12/0837 |
| | | | | 711/119 |
| 2016/0147534 A1 * | 5/2016 | Lewis | ................... | G06F 9/3851 |
| | | | | 712/216 |

OTHER PUBLICATIONS

"International Search Report and Written Opinion Issued in PCT Application No. PCT/US2020/036552", dated Sep. 17, 2020, 12 Pages. (MS# 406949-WO-PCT).

* cited by examiner

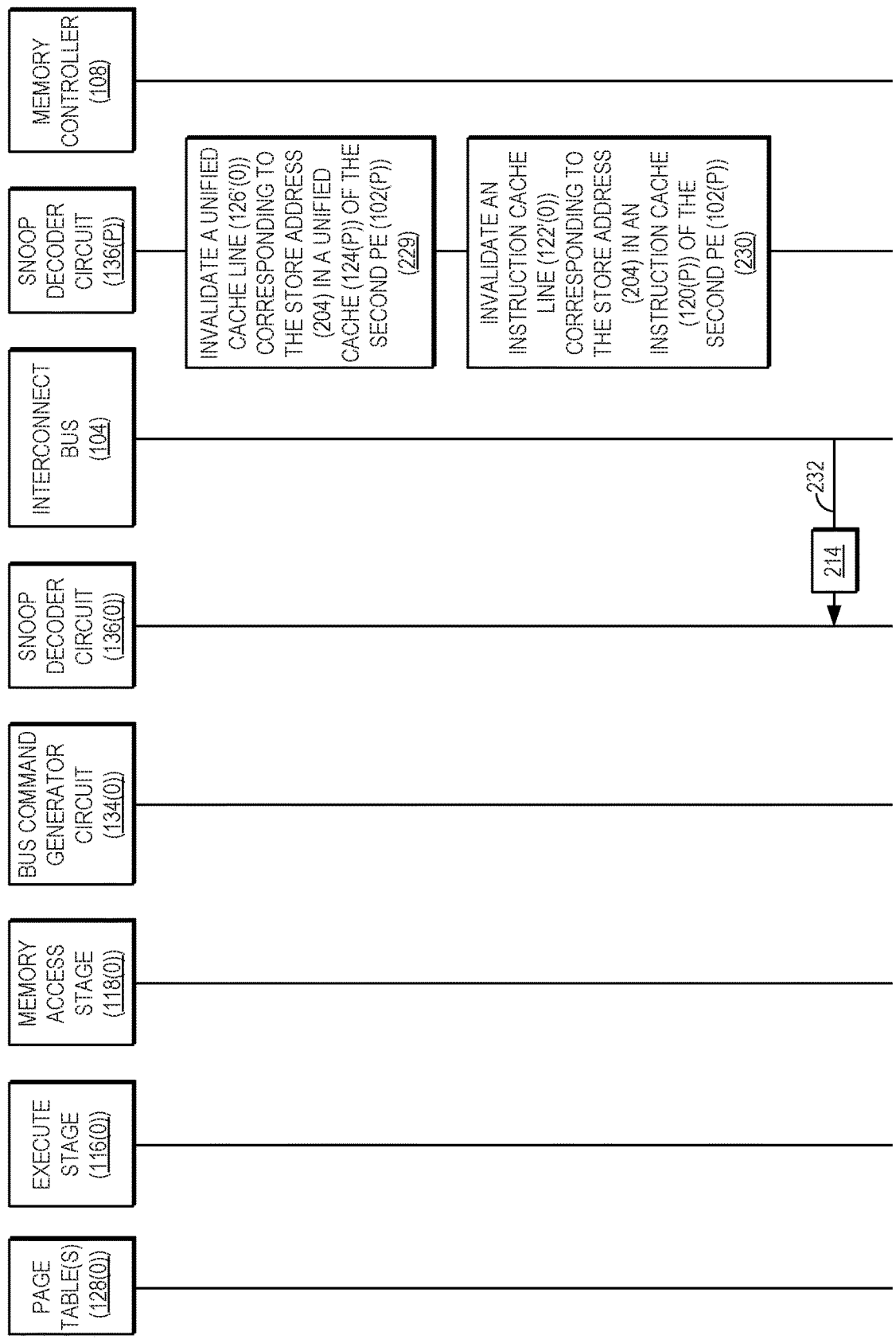

PERFORMING ATOMIC STORE-AND-INVALIDATE OPERATIONS IN PROCESSOR-BASED DEVICES

FIELD OF THE DISCLOSURE

The technology of the disclosure relates to instruction cache coherency in processor-based devices and, more particularly, to maintaining instruction cache coherency after modification of memory locations holding instructions to be executed.

BACKGROUND

When executing software on modern processor-based devices, the need may arise to modify one or more memory locations that hold instructions to be executed. As non-limiting examples, software may include self-modifying code that dynamically generates instructions to execute, or an operating system may load instructions to memory for one executing process by overwriting instructions within memory that was previously allocated for another process. In each of these scenarios, software modifies the content of memory at a given memory location to write instructions that will be executed if and when a process branches to that memory location again.

One challenge resulting from modifying instructions in memory is guaranteeing that, when a process branches to a memory location at which new instructions have been written, the process will encounter and execute the new instructions instead of older overwritten instructions. In this regard, modern computer architectures provide coherency mechanisms to ensure that all processors within a single operating environment observe a coherent view of memory, even in the presence of instruction caches and/or unified caches. These mechanisms make certain that, for each store operation that writes new data to a given memory location, all cached copies of the contents of that memory location are invalidated from instruction caches, and further may ensure that all cached copies of the contents of that memory location in unified caches are updated with the new data.

In general, conventional computer architectures provide two methods by which coherency between instruction caches and memory is maintained. The first method enforces hardware-based coherency between instruction caches and memory by requiring that every store operation to a given memory location be checked against all instruction caches within the processor-based device to determine whether a copy of a cache line corresponding to that memory location exists and needs to be invalidated or updated. However, this approach requires additional hardware (e.g., an extra port on each instruction cache to support parallel tag lookups, and/or a duplicate copy of the instruction cache tags to filter accesses) to avoid negative performance effects.

Alternatively, coherency between instruction caches and memory may be maintained using software management. For instance, after performing a store operation to the given memory location, software may execute a special instruction to invalidate cache lines corresponding to that memory location within instruction caches. The software may also be required to execute a synchronization operation between the store operation and the invalidation of the instruction cache lines. While this software-based approach does not require additional hardware, it does incur performance penalties in the form of decreased processor performance due to the need to execute the extra synchronization and invalidation instructions.

Accordingly, a more efficient mechanism for maintaining instruction cache coherency after modification of memory locations that hold instructions is desirable.

SUMMARY

Exemplary embodiments disclosed herein include performing atomic store-and-invalidate operations in processor-based devices. In one exemplary embodiment, a processing element (PE) of one or more PEs of a processor-based device includes a store-and-invalidate logic circuit that is used by a memory access stage of an execution pipeline of the PE to perform an atomic store-and-invalidate operation. Upon receiving an indication to perform a store-and-invalidate operation (e.g., in response to execution of a store-and-invalidate instruction) comprising a store address and store data, the memory access stage uses the store-and-invalidate logic circuit to write the store data to memory (e.g., to a system memory or to a unified cache), and also to invalidate an instruction cache line corresponding to the store address in an instruction cache of the PE. The operations for storing data and invalidating instruction cache lines are performed as one atomic store-and-invalidate operation by the store-and-invalidate logic circuit, such that the store-and-invalidate operation is considered successful only if both the store operation and the invalidate operation are performed successfully. In embodiments of the processor-based device that include multiple PEs, the store-and-invalidate logic circuit of a first PE may also generate a store-and-invalidate bus command that is broadcast to other PEs. The other PEs may then invalidate instruction cache lines corresponding to the store address in their local instruction caches, and may also write the store data into unified cache lines corresponding to the store address in their local unified caches. In this manner, instruction cache coherency may be more efficiently maintained without requiring hardware modifications to instruction caches and without incurring the performance penalties associated with separately executing multiple store and invalidate instructions.

In this regard, in one exemplary embodiment, a processor-based device is provided. The processor-based device includes one or more PEs that are communicatively coupled to each other via an interconnect bus. Each PE of the one or more PEs includes an execution pipeline comprising a memory access stage, as well as an instruction cache and a store-and-invalidate logic circuit. Each PE is configured to receive, by the memory access stage of the execution pipeline, an indication to perform a store-and-invalidate operation, the indication comprising a store address and store data. Each PE is further configured to, responsive to receiving the indication, atomically perform the store-and-invalidate operation. To atomically perform the store-and-invalidate operation, each PE is configured to write, using the store-and-invalidate logic circuit, the store data to a memory location indicated by the store address, and invalidate, using the store-and-invalidate logic circuit, an instruction cache line corresponding to the store address in the instruction cache.

In another exemplary embodiment, a method for providing a store-and-invalidate operation is provided. The method includes receiving, by a memory access stage of an execution pipeline of a PE of one or more PEs of a processor-based device, an indication to perform a store-and-invalidate operation, the indication comprising a store address and store data. The method further includes, responsive to receiving the indication, atomically performing the store-and-invalidate operation by writing, by a store-and-invalidate logic circuit of the PE, the store data to a memory location indicated by the store address. The method also includes atomically performing the store-and-invalidate operation by further invalidating, by the store-and-invalidate logic circuit, an instruction cache line corresponding to the store address in an instruction cache of the PE.

In another exemplary embodiment, a non-transitory computer-readable medium is provided. The non-transitory computer-readable medium stores computer-executable instructions which, when executed by a processor, cause the processor to receive an indication to perform a store-and-invalidate operation, the indication comprising a store address and store data. The computer-executable instructions further cause the processor to, responsive to receiving the indication, atomically perform the store-and-invalidate operation by causing the processor to write the store data to a memory location indicated by the store address. The computer-executable instructions also cause the processor to atomically perform the store-and-invalidate operation by further causing the processor to invalidate an instruction cache line corresponding to the store address in an instruction cache of the processor.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

FIGS. 2A-2E are communications flow diagrams illustrating exemplary operations and communications among elements of the processor-based device of FIG. 1 for atomically performing a store-and-invalidate operation;

DETAILED DESCRIPTION

Exemplary embodiments disclosed herein include performing atomic store-and-invalidate operations in processor-based devices. In one exemplary embodiment, a processing element (PE) of one or more PEs of a processor-based device includes a store-and-invalidate logic circuit that is used by a memory access stage of an execution pipeline of the PE to perform an atomic store-and-invalidate operation. Upon receiving an indication to perform a store-and-invalidate operation (e.g., in response to execution of a store-and-invalidate instruction) comprising a store address and store data, the memory access stage uses the store-and-invalidate logic circuit to write the store data to a system memory, and also to invalidate an instruction cache line corresponding to the store address in an instruction cache of the PE. The operations for storing data and invalidating instruction cache lines are performed as one atomic store-and-invalidate operation by the store-and-invalidate logic circuit, such that the store-and-invalidate operation is considered successful only if both the store operation and the invalidate operation are performed successfully. In embodiments of the processor-based device that include multiple PEs, the store-and-invalidate logic circuit of a first PE may also generate a store-and-invalidate bus command that is broadcast to other PEs. The other PEs may then invalidate instruction cache lines corresponding to the store address in their local instruction caches, and may also write the store data into unified cache lines corresponding to the store address in their local unified caches. In this manner, instruction cache coherency may be more efficiently maintained without requiring hardware modifications to instruction caches and without incurring the performance penalties associated with separately executing multiple store and invalidate instructions.

Figure 1:
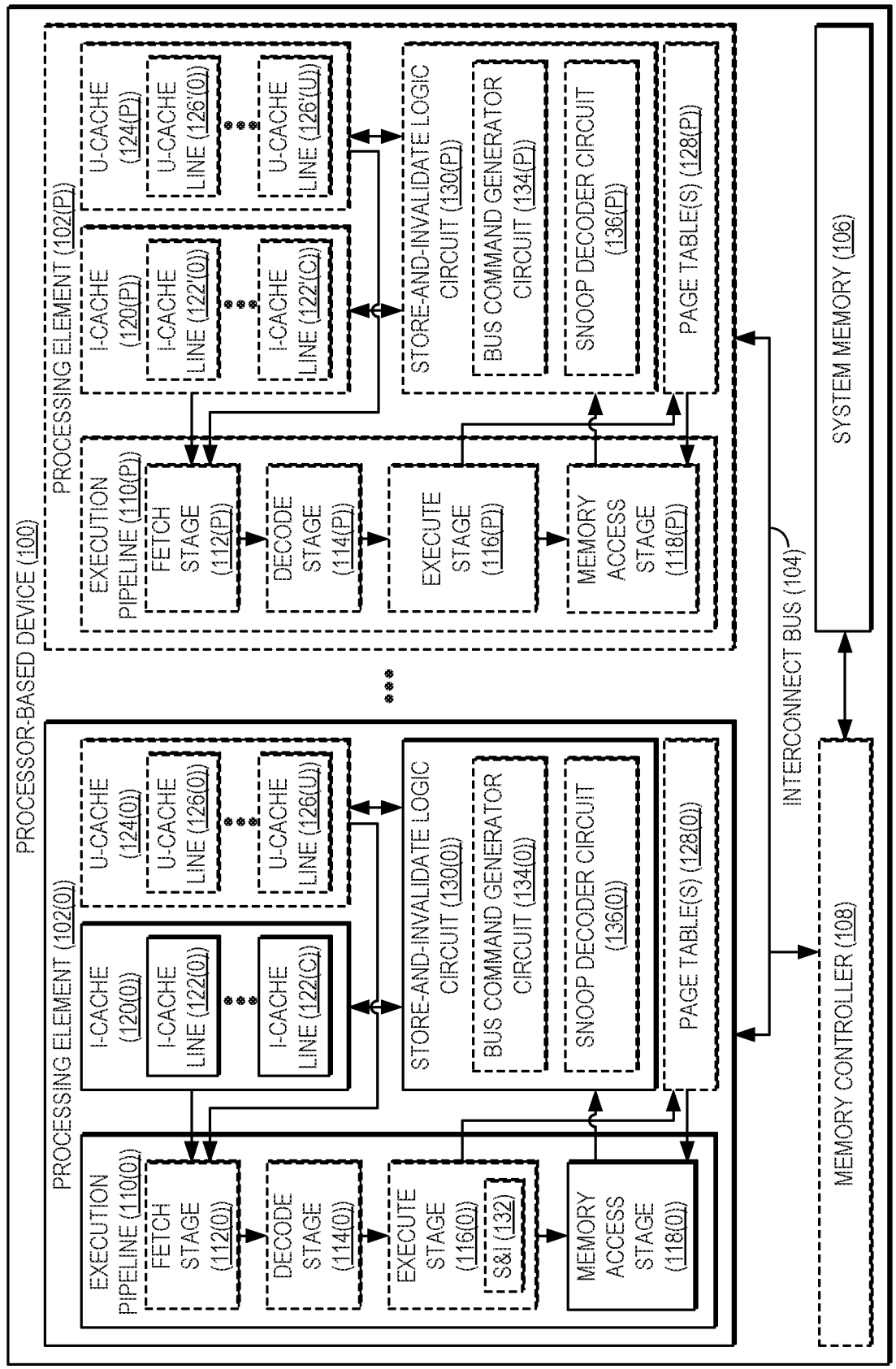
FIG. 1 is a schematic diagram of an exemplary processor-based device that includes one or more processing elements (PEs) comprising a store-and-invalidate logic circuit configured to atomically perform a store-and-invalidate operation.

In this regard, FIG. 1 illustrates an exemplary processor-based device 100 that provides one or more processing elements (PEs) 102(0)-102(P) for concurrent processing of executable instructions. Each of the PEs 102(0)-102(P) may comprise a central processing unit (CPU) having one or more processor cores, or may comprise an individual processor core comprising a logical execution unit and associated caches and functional units. In the example of FIG. 1, the PEs 102(0)-102(P) are communicatively coupled via an interconnect bus 104, over which inter-processor communications (such as snoop requests and snoop responses, as non-limiting examples) are communicated. In some embodiments, the interconnect bus 104 may include additional constituent elements (e.g., a bus controller circuit and/or an arbitration circuit, as non-limiting examples) that are not shown in FIG. 1 for the sake of clarity. The PEs 102(0)-102(P) are also communicatively coupled to a system memory 106 via the interconnect bus 104. In some embodiments, the interconnect bus 104 is communicatively coupled to a memory controller 108, which controls access to the system memory 106 and manages the flow of data to and from the system memory 106. It is to be understood that some embodiments of the processor-based device 100 may comprise a single PE 102 rather than the multiple PEs 102(0)-102(P) shown in the example of FIG. 1.

Each of the PEs 102(0)-102(P) of FIG. 1 includes a corresponding execution pipeline 110(0)-110(P) that is configured to execute a corresponding instruction stream comprising computer-executable instructions. In the example of FIG. 1, the execution pipelines 110(0)-110(P) respectively include fetch stages 112(0)-112(P) for retrieving instructions for execution, decode stages 114(0)-114(P) for translating fetched instructions into control signals for instruction execution, execute stages 116(0)-116(P) for actually performing instruction execution, and memory access stages 118(0)-118(P) for carrying out memory access operations (e.g., load operations and/or store operations) resulting from instruction execution. It is to be understood that some embodiments of the PEs 102(0)-102(P) may include fewer or more stages than those illustrated in the example of FIG. 1.

The PEs 102(0)-102(P) of FIG. 1 also include corresponding instruction caches 120(0)-120(P) (captioned as "I-CACHE" in FIG. 1) comprising respective pluralities of instruction cache lines 122(0)-122(C), 122'(0)-122'(C). The instruction cache lines 122(0)-122(C), 122'(0)-122'(C) of the instruction caches 120(0)-120(P) are configured to hold copies of instructions that were previously fetched by the respective fetch stages 112(0)-112(P), and that may be accessed by the respective fetch stages 112(0)-112(P) in lieu of fetching an instruction from the system memory 106. Additionally, the PEs 102(0)-102(P) in some embodiments may also include corresponding unified caches 124(0)-124(P) (captioned as "U-CACHE" in FIG. 1) comprising respective pluralities of unified cache lines 126(0)-126(U), 126'(0)-126'(U). The unified cache lines 126(0)-126(U), 126'(0)-126'(U) are configured to hold copies of previously fetched instructions and/or copies of previously fetched data. Thus, for example, if an instruction to be fetched by one of the fetch stages 112(0)-112(P) is not found in the corresponding instruction cache 120(0)-120(P), the fetch stage 112(0)-112(P) may next attempt to retrieve the instruction from the corresponding unified cache 124(0)-124(P) before fetching the instruction from the system memory 106. In some embodiments, the instruction caches 120(0)-120(P) and the unified caches 124(0)-124(P) may represent different levels in a cache hierarchy. For example, the unified caches 124(0)-124(P) in such embodiments may represent Level 2 (L2) caches, while the instruction caches 120(0)-120(P) may represent Level 1 (L1) caches.

Some embodiments of the PEs 102(0)-102(P) may each also provide a corresponding one or more page tables 128(0)-128(P). The page tables 128(0)-128(P) may be provided by corresponding translation lookaside buffers (TLBs) and are configured to hold recent translations of virtual memory addresses to physical memory addresses, enabling more rapid access to data in the system memory 106. For each virtual-to-memory address translation, the page tables 128(0)-128(P) according to some embodiments may also hold a flag or other indicia to indicate whether the corresponding physical memory address holds executable code.

The processor-based device 100 of FIG. 1 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, the PEs 102(0)-102(P) may further include cache controller circuits for each of the instruction caches 120(0)-120(P), cache controller circuits for each of the unified caches 124(0)-124(P), and/or additional memory devices, caches, and/or controller circuits.

As noted above, the PEs 102(0)-102(P) of FIG. 1 may be used to execute software that performs memory access operations to modify the contents of memory locations in the system memory 106 in which instructions to be executed are held. Consequently, the PEs 102(0)-102(P) require a coherency mechanism to ensure that each of the PEs 102(0)-102(P) observes a coherent view of the contents of the system memory 106, the instruction caches 120(0)-120(P), and the unified caches 124(0)-124(P) (where present). However, as noted above, conventional approaches to providing coherency mechanisms generally require either hardware modifications to the instruction caches 120(0)-120(P), or the execution of multiple store, synchronization, and cache line invalidation instructions by software for each modification of a memory location in the system memory 106 in which instructions to be executed are held.

In this regard, each of the PEs 102(0)-102(P) is configured to atomically perform store-and-invalidate operations using a corresponding store-and-invalidate logic circuit 130(0)-130(P). Referring to the PE 102(0) as an example, the memory access stage 118(0) of the PE 102(0) in exemplary operation receives an indication (not shown) to perform a store-and-invalidate operation, where the indication includes store data (e.g., an instruction to be executed) and a store address (e.g., an address within a memory region allocated for holding instructions) to which the store data is to be written. In some embodiments, the indication may be received in response to the execute stage 116(0) of the PE 102(0) executing a store-and-invalidate instruction ("S&I") 132 defined by an instruction set architecture (ISA) of the processor-based device 100. Some embodiments may provide that the indication comprises an indication received by the memory access stage 118(0) of the PE 102(0) from the page table(s) 128(0), informing the memory access stage 118(0) that the contents of the memory location indicated by the store address are executable. The memory access stage 118(0) in such embodiments may then initiate the atomic store-and-invalidate operation automatically.

In response to receiving the indication, the memory access stage 118(0) uses the store-and-invalidate logic circuit 130(0) of the PE 102(0) to atomically perform the store-and-invalidate operation. In particular, the store-and-invalidate logic circuit 130(0) writes the store data to a memory location indicated by the store address (e.g., by writing the store data to a memory location indicated by the store address in system memory, or by writing the store data to a unified cache line 126(0)-126(U) corresponding to the store address in the unified cache 124(0)). The store-and-invalidate logic circuit 130(0) then invalidates an instruction cache line corresponding to the store address among the instruction cache lines 122(0)-122(C) in the instruction cache 120(0) of the PE 102(0). The store-and-invalidate logic circuit 130(0) ensures that the store-and-invalidate operation is performed atomically, such that both the individual store operation and the individual instruction cache line invalidation operation must be successfully completed for the atomic store-and-invalidate operation to be successfully completed. According to some embodiments, before invalidating the instruction cache line corresponding to the store address, the store-and-invalidate logic circuit 130(0) may invalidate a unified cache line corresponding to the store address among the unified cache lines 126(0)-126(U) of the unified cache 124(0), or may write the store data in the unified cache line corresponding to the store address among the unified cache lines 126(0)-126(U) of the unified cache 124(0).

In some embodiments, each of the store-and-invalidate logic circuits 130(0)-130(P) comprises a corresponding bus command generator circuit 134(0)-134(P) that may be used by the store-and-invalidate logic circuits 130(0)-130(P) in carrying out the store operation to write the store data to the system memory 106. In the example of PE 102(0), the bus command generator circuit 134(0) may generate a store-and-invalidate bus command (not shown) comprising the store address and the store data, and may issue the store-and-invalidate bus command to the interconnect bus 104.

In some embodiments, the PE 102(0) may be one of a plurality of PEs 102(0)-102(P) in which the store-and-invalidate logic circuits 130(0)-130(P) further comprise corresponding snoop decoder circuits 136(0)-136(P). The store-and-invalidate bus command from the store-and-invalidate logic circuit 130(0) of the PE 102(0) (i.e., the "first PE 102(0)") is broadcast by the interconnect bus 104 to one or more PEs of the plurality of PEs 102(0)-102(P), including, for example, the PE 102(P) (i.e., the "second PE 102(P)").

The store-and-invalidate bus command is then received by the snoop decoder circuits 136(0)-136(P) of the one or more PEs of the plurality of PEs 102(0)-102(P). Some embodiments may provide that the interconnect bus 104 broadcasts the store-and-invalidate bus command to every PE of the plurality of PEs 102(0)-102(P), or may provide that the interconnect bus 104 only broadcasts the store-and-invalidate bus command to one or more PEs of the plurality of PEs 102(0)-102(P) that potentially cache the store data.

Referring to the second PE 102(P) as an example, after the snoop decoder circuit 136(P) of the store-and-invalidate logic circuit 130(P) of the second PE 102(P) receives the store-and-invalidate bus command broadcast by the interconnect bus 104, the snoop decoder circuit 136(P) invalidates an instruction cache line corresponding to the store address among the instruction cache lines 122'(0)-122'(P) in the instruction cache 120(P) of the second PE 102(P). Before invalidating the instruction cache line corresponding to the store address, the snoop decoder circuit 136(P) in some embodiments may also invalidate a unified cache line corresponding to the store address among the unified cache lines 126'(0)-126'(U) of the unified cache 124(P), or may write the store data to the unified cache line corresponding to the store address among the unified cache lines 126'(0)-126'(U) of the unified cache 124(P). This ensures that the store data for the store address will be correctly read from memory or from the unified cache 124(P) if a miss on the store address occurs when accessing the instruction cache 120(P).

It is to be understood that, in embodiments of the processor-based device 100 comprising a plurality of PEs 102(0)-102(P), each of the PEs 102(0)-102(P) may perform operations corresponding to the operations described above with respect to the second PE 102(P). Thus, for example, the snoop decoder circuit 136(0) of the first PE 102(0) may also receive the store-and-invalidate bus command broadcast by the interconnect bus 104. The first PE 102(0) may then invalidate an instruction cache line corresponding to the store address among the instruction cache lines 122(0)-122(C) in the instruction cache 120(0) of the first PE 102(0) in response to receiving the store-and-invalidate bus command from the interconnect bus 104.

To illustrate communication flows among elements of the processor-based device 100 of FIG. 1 for atomically performing store-and-invalidate operations according to one example, FIGS. 2A-2E are provided. Elements of FIG. 1 are referenced in describing FIGS. 2A-2E for the sake of clarity. As seen in FIGS. 2A-2E, each of the page table(s) 128(0), the execute stage 116(0) and the memory access stage 118(0) of the execution pipeline 110(0), the bus command generator circuit 134(0) and the snoop decoder circuit 136(0) of the store-and-invalidate logic circuit 130(0), the interconnect bus 104, the snoop decoder circuit 136(P) of the store-and-invalidate logic circuit 130(P), and the memory controller 108 is represented by vertical lines, with communications between these elements illustrated by captioned arrows, and operations performed by each element illustrated by captioned boxes.

Figure 2A:
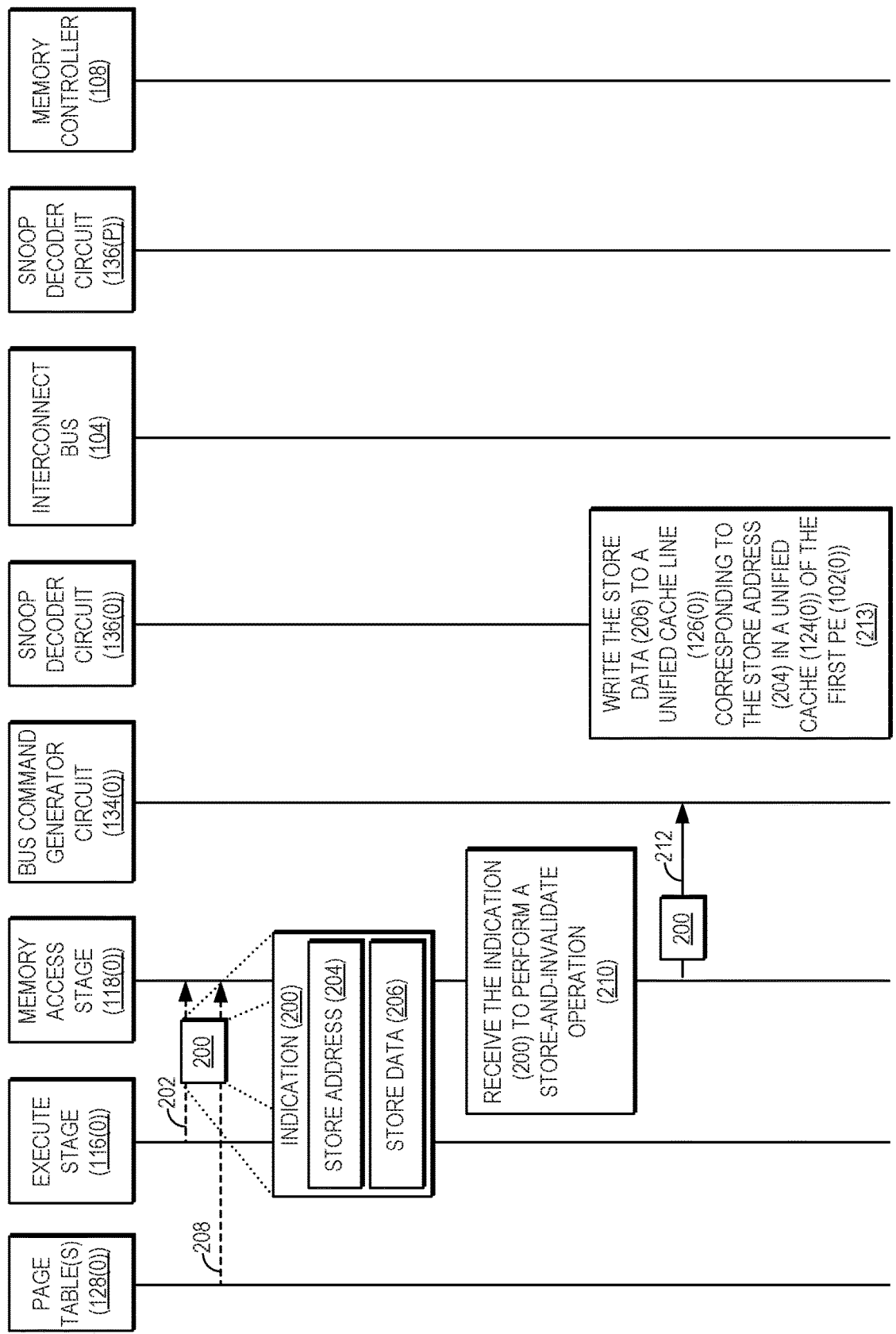

In the example of FIG. 2A, operations begin in some embodiments with the execute stage 116(0) sending an indication 200 to perform a store-and-invalidate operation to the memory access stage 118(0), as indicated by arrow 202. In such embodiments, the indication 200 may be sent by the execute stage 116(0) in response to executing a store-and-invalidate instruction such as the store-and-invalidate instruction 132 of FIG. 1. The store-and-invalidate instruction 132 in such embodiments may be based on a conventional store instruction having a store-and-invalidate bit indicator set, or may comprise a custom instruction provided by the ISA of the processor-based device of FIG. 1. As seen in FIG. 2A, the indication 200 provides a store address 204 indicating the memory location in the system memory 106 to which the store-and-invalidate operation is directed, as well as store data 206 representing the executable instruction to be written. In some embodiments, the indication 200 may comprise an indication from the page table(s) 128(0) indicating that the contents of the memory address indicated by the store address 204 are executable, as indicated by arrow 208. In such embodiments, an atomic store-and-invalidate operation may be automatically triggered by the indication from the page table(s) 128(0) in response to a conventional store instruction being executed by the execute stage 116(0).

Next, the memory access stage 118(0) receives the indication 200 to perform the store-and-invalidate operation, as indicated by block 210. In response to receiving the indication 200, the memory access stage 118(0) according to one embodiment provides the indication 200 to the bus command generator circuit 134(0), as indicated by arrow 212. In some embodiments, the snoop decoder circuit 136(0), in parallel with the operation indicated by arrow 212, may write the store data 206 to a unified cache line, such as the unified cache line 126(0) of FIG. 1, corresponding to the store address 204 in the unified cache 124(0), as indicated by block 213. Operations then continue in FIG. 2B.

Figure 2B:
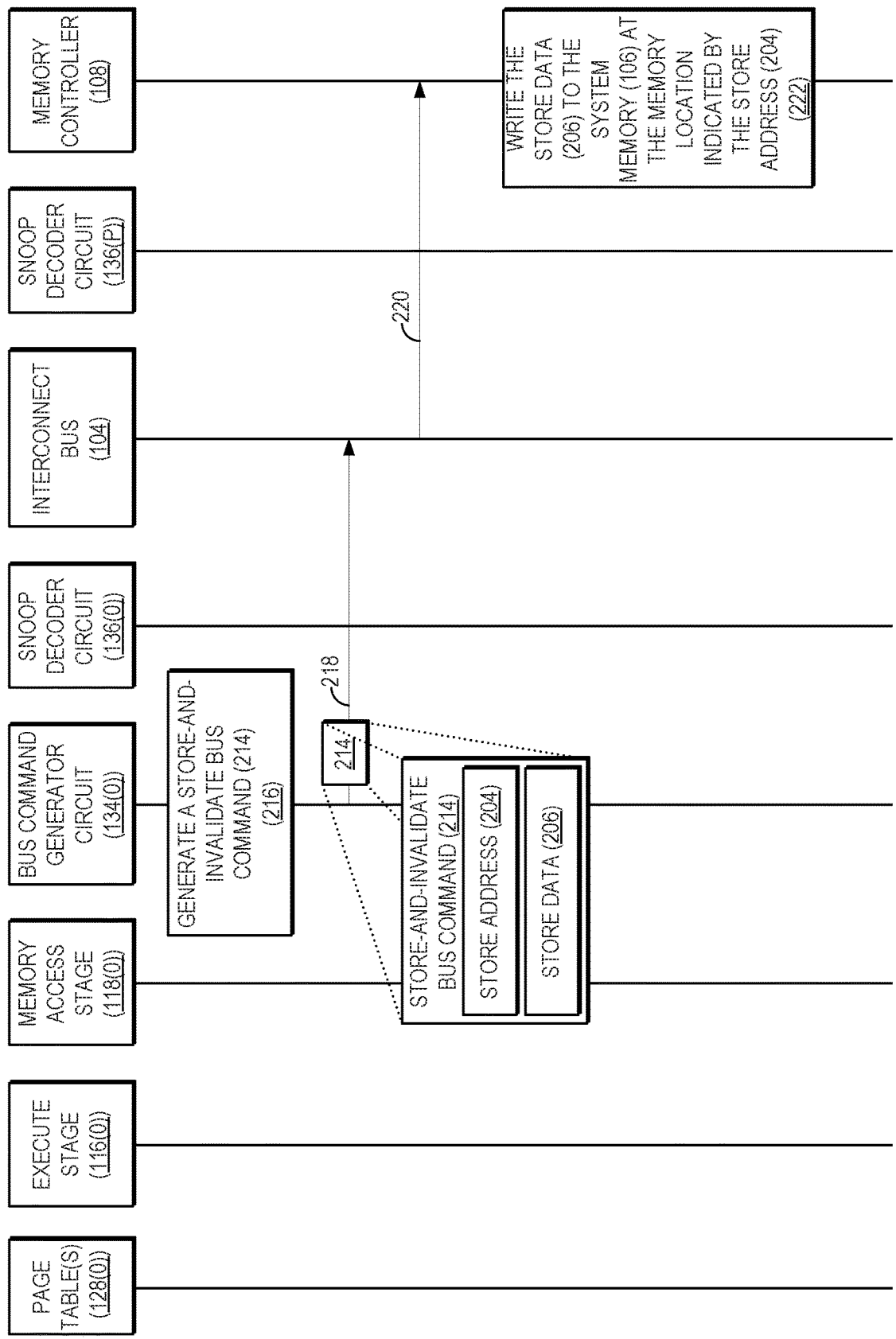

Referring now to FIG. 2B, the bus command generator circuit 134(0) generates a store-and-invalidate bus command 214, as indicated by block 216. As seen in FIG. 2B, the store-and-invalidate bus command 214 comprises or otherwise indicates the store address 204 and the store data 206. The store-and-invalidate bus command 214 is then issued to the interconnect bus 104 by the bus command generator circuit 134(0), as indicated by arrow 218. In some embodiments (e.g., wherein the PE 102(0) is configured to write-through to the system memory 106), upon receiving the store-and-invalidate bus command 214 from the bus command generator circuit 134(0), the interconnect bus 104 instructs the memory controller 108 to write the store data 206 to the system memory 106 at the memory location indicated by the store address 204, as indicated by arrow 220. The memory controller 108 then writes the store data 206, as indicated by block 222. Operations then continue in FIG. 2C.

Figure 2C:
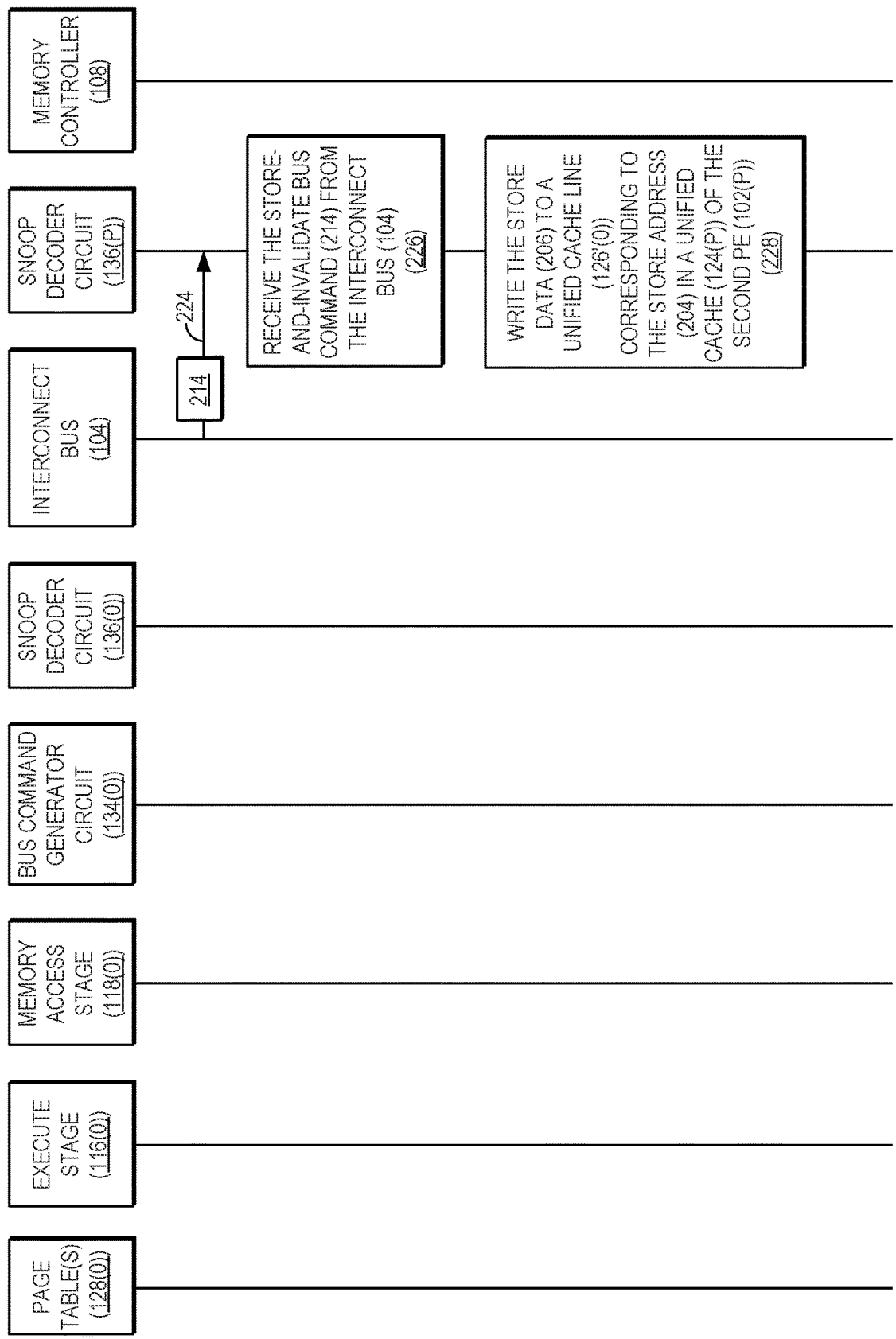

Turning now to FIG. 2C, the interconnect bus 104 also broadcasts the store-and-invalidate bus command 214 to the snoop decoder circuit 136(P), as indicated by arrow 224. It is to be understood that, in some embodiments, the operation for broadcasting the store-and-invalidate bus command 214 indicated by arrow 224 may be performed in parallel with the operation described above with respect to arrow 220 in FIG. 2B. The snoop decoder circuit 136(P) receives the store-and-invalidate bus command 214 from the interconnect bus 104, as indicated by block 226. In response to receiving the store-and-invalidate bus command 214, the snoop decoder circuit 136(P), in some embodiments, writes the store data 206 to a unified cache line, such as the unified cache line 126'(0) of FIG. 1, corresponding to the store address 204 in the unified cache 124(P)136, as indicated by block 228. Operations then continue in FIG. 2D.

Figure 2E:
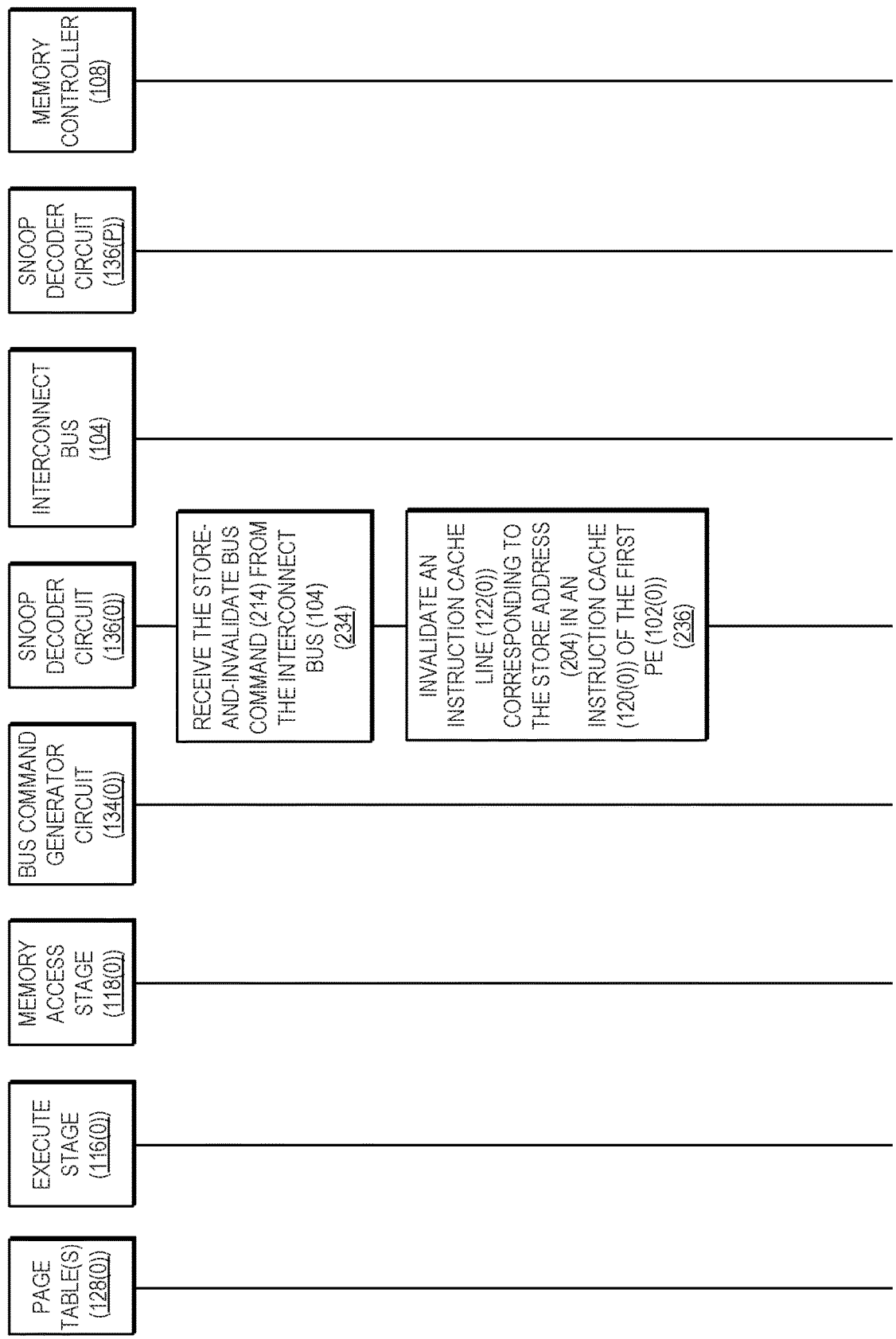

Referring now to FIG. 2D, 136 in embodiments in which the operations of block 228 are not performed, the snoop decoder circuit 136(P) may invalidate the unified cache line 126'(0) corresponding to the store address 204 in the unified cache 124(P), as indicated by block 229. Regardless of whether the operations of blocks 228 or 229 are performed, the snoop decoder circuit 136(P) then invalidates an instruction cache line, such as the instruction cache line 122'(0) of FIG. 1, corresponding to the store address 204 in the instruction cache 120(P), as indicated by block 230. The interconnect bus 104 broadcasts the store-and-invalidate bus command 214 to the snoop decoder circuit 136(0), as indicated by arrow 232. Finally, as seen in FIG. 2E, the snoop decoder circuit 136(0) receives the store-and-invalidate bus command 214 from the interconnect bus 104, as indicated by block 234. The snoop decoder circuit 136(0) then invalidates an instruction cache line, such as the instruction cache line 122(0) of FIG. 1, corresponding to the store address 204 in the instruction cache 120(0), as indicated by block 236. It is to be understood that, in some embodiments, operations of block 236 for invalidating the instruction cache line 122(0) may be performed in parallel with the operation described above with respect to arrow 212 of FIG. 2A, rather than at the point illustrated in FIG. 2E.136

Figure 3A:
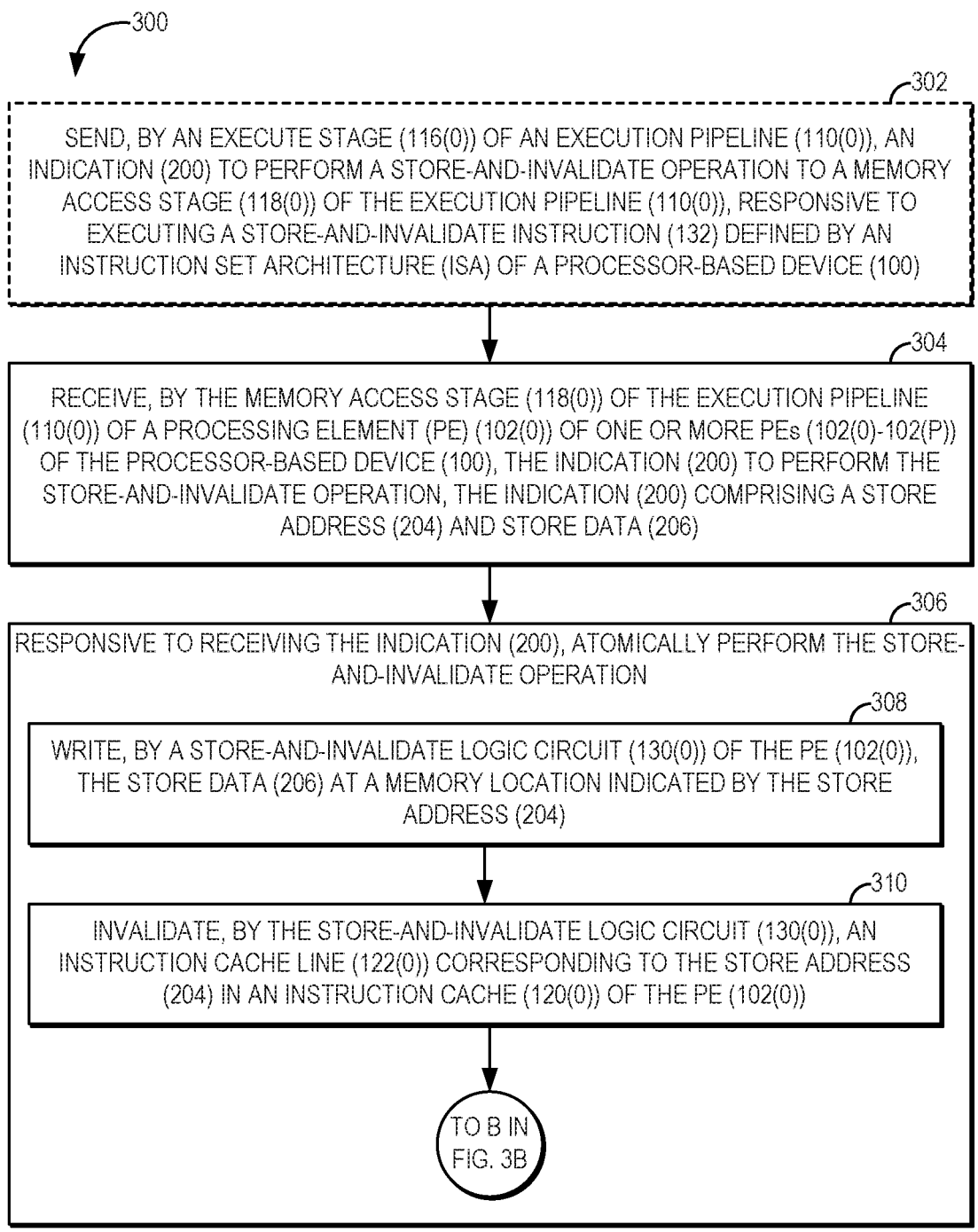
FIGS. 3A and 3B are flowcharts illustrating exemplary operations for atomically performing store-and-invalidate operations by the processor-based device of FIG. 1.
Figure 3B:
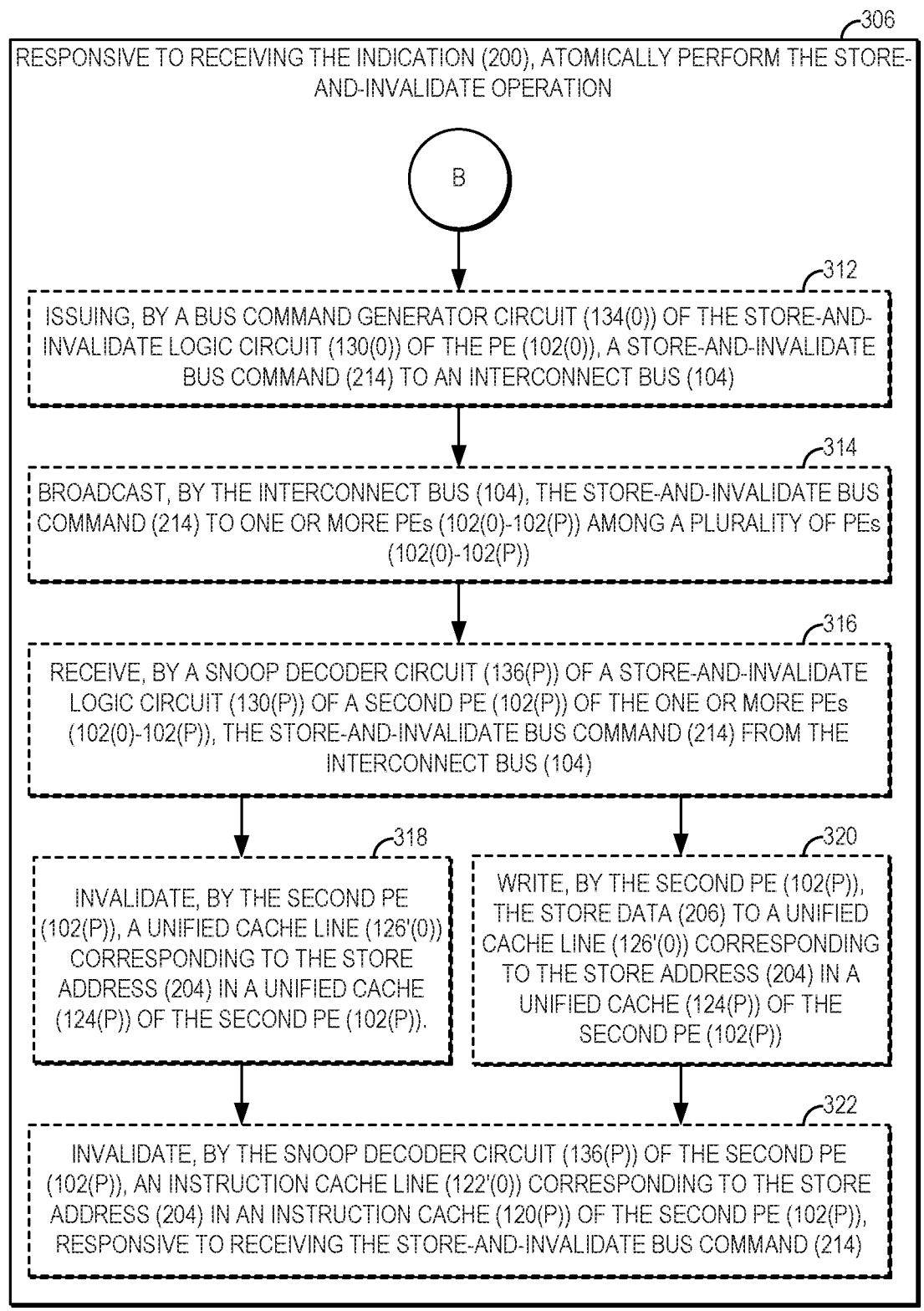

FIGS. 3A and 3B illustrate exemplary operations 300 for atomically performing store-and-invalidate operations by the processor-based device 100 of FIG. 1. For the sake of clarity, elements of FIGS. 1 and 2A-2E are referenced in describing FIGS. 3A and 3B. The operations 300 in FIG. 3A, according to some embodiments, begin with the execute stage 116(0) of the execution pipeline 110(0) sending the indication 200 to perform the store-and-invalidate operation to the memory access stage 118(0) of the execution pipeline 110(0) responsive to executing the store-and-invalidate instruction 132 defined by an ISA of the processor-based device 100 (block 302). The memory access stage 118(0) of the execution pipeline 110(0) of the PE 102(0) of one or more PEs 102(0)-102(P) of the processor-based device 100 then receives the indication 200 to perform the store-and-invalidate operation, the indication 200 comprising a store address 204 and store data 206 (block 304). In response to receiving the indication 200, the memory access stage 118(0) uses the store-and-invalidate logic circuit 130(0) of the PE 102(0) to atomically perform the store-and-invalidate operation (block 306). Operations of block 306 for atomically performing the store-and-invalidate operation include the store-and-invalidate logic circuit 130(0) of the PE 102(0) writing the store data 206 to a memory location indicated by the store address 204 (block 308). In some embodiments, operations for writing the store data 206 to the memory location indicated by the store address 204 may comprise writing the store data 206 to a memory location indicated by the store address 204 in the system memory 106, or may comprise writing the store data 206 to a unified cache line 126(0)-126(U) corresponding to the store address 204 in the unified cache 124(0). The store-and-invalidate logic circuit 130(0) also invalidates an instruction cache line, such as an instruction cache line 122(0), corresponding to the store address 204 in the instruction cache 120(0) of the PE 102(0) (block 310). In some embodiments, processing resumes in FIG. 3B.

Referring now to FIG. 3B, some embodiments may also provide that the store-and-invalidate logic circuit 130(0) (e.g., the bus command generator circuit 134(0), as a non-limiting example) of the PE 102(0) issues a store-and-invalidate bus command, such as the store-and-invalidate bus command 214, to the interconnect bus 104 (block 312). The interconnect bus 104 then broadcasts the store-and-invalidate bus command 214 to one or more PEs 102(0)-102(P) among the plurality of PEs 102(0)-102(P) (block 314). The snoop decoder circuit 136(P) of the store-and-invalidate logic circuit 130(P) of a second PE, such as the PE 102(P), receives the store-and-invalidate bus command 214 from the interconnect bus 104 (block 316). In some embodiments, the second PE 102(P) may invalidate a unified cache line, such as the unified cache line 126'(0), corresponding to the store address 204 in the unified cache 124(P) of the second PE 102(P) (block 318). In embodiments in which the operations of block 318 for invalidating the unified cache line 126'(0) are not performed, the second PE 102(P) may write the store data 206 to the unified cache line 126'(0) corresponding to the store address 204 in the unified cache 124(P) of the second PE 102(P) (block 320). The snoop decoder circuit 136(P) then invalidates an instruction cache line, such as the instruction cache line 122'(0), corresponding to the store address 204 in the instruction cache 120(P) of the second PE 102(P), responsive to receiving the store-and-invalidate bus command 214 (block 322).

Figure 4:
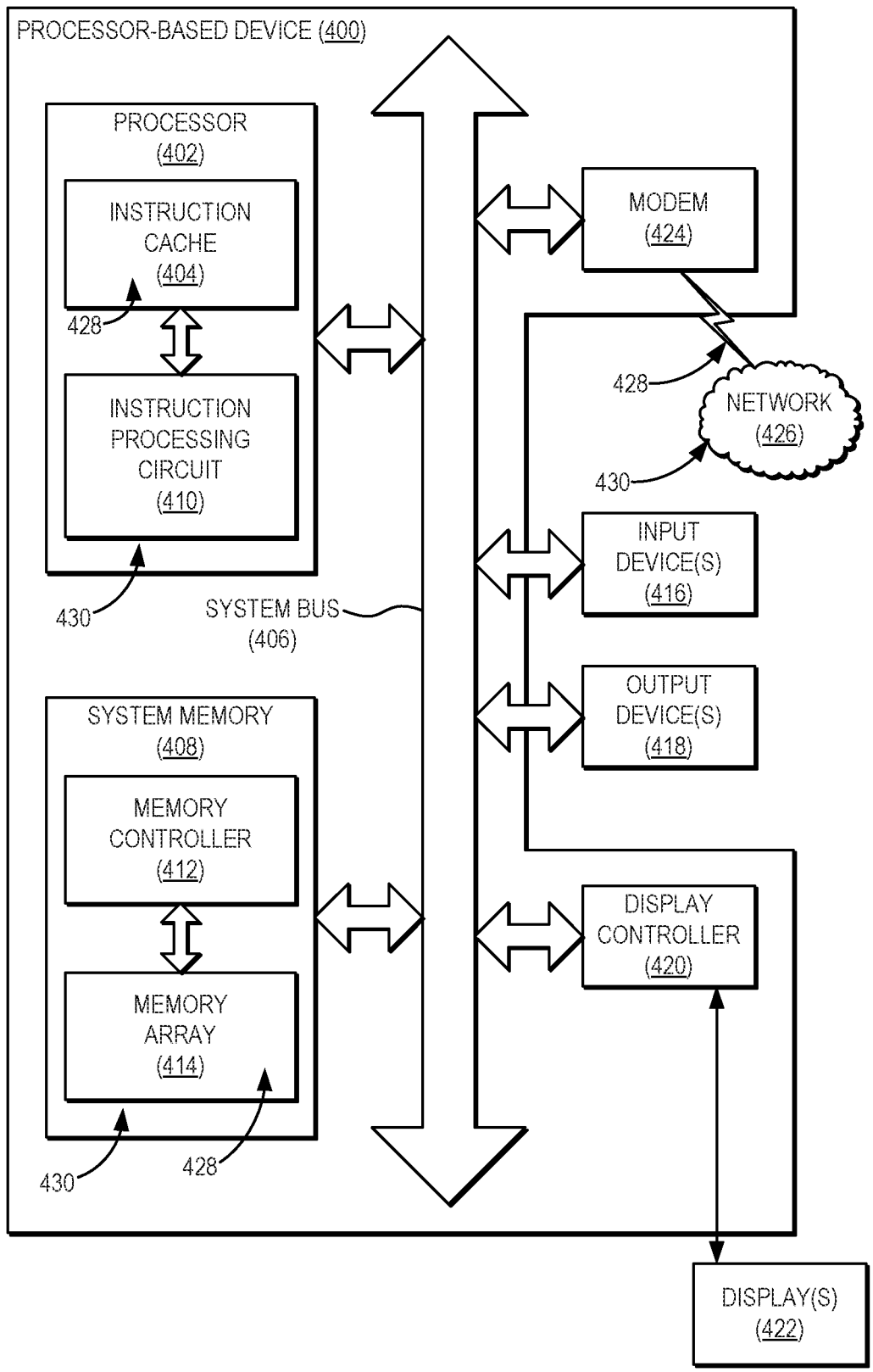
FIG. 4 is a block diagram of an exemplary processor-based device, such as the processor-based device of FIG. 1, that is configured to atomically perform store-and-invalidate operations.

FIG. 4 is a block diagram of an exemplary processor-based device 400, such as the processor-based device 100 of FIG. 1, that provides atomic store-and-invalidate operations. The processor-based device 400 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 400 includes a processor 402. The processor 402 represents one or more general-purpose processing circuits, such as a microprocessor, central processing unit, or the like, and may correspond to the PEs 102(0)-102(P) of FIG. 1. The processor 402 is configured to execute processing logic in instructions for performing the operations and steps discussed herein. In this example, the processor 402 includes an instruction cache 404 (corresponding to the instruction caches 120(0)-120(P) of FIG. 1) for temporary, fast access memory storage of instructions and an instruction processing circuit 410. Fetched or prefetched instructions from a memory, such as from a system memory 408 over a system bus 406, are stored in the instruction cache 404. The instruction processing circuit 410 is configured to process instructions fetched into the instruction cache 404 and process the instructions for execution.

The processor 402 and the system memory 408 are coupled to the system bus 406 (corresponding to the interconnect bus 104 of FIG. 1) and can intercouple peripheral devices included in the processor-based device 400. As is well known, the processor 402 communicates with these other devices by exchanging address, control, and data information over the system bus 406. For example, the processor 402 can communicate bus transaction requests to a memory controller 412 in the system memory 408 as an example of a peripheral device. Although not illustrated in FIG. 4, multiple system buses 406 could be provided, wherein each system bus constitutes a different fabric. In this example, the memory controller 412 is configured to provide memory access requests to a memory array 414 in the system memory 408. The memory array 414 is comprised of an array of storage bit cells for storing data. The system memory 408 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 406. As illustrated in FIG. 4, these devices can include the system memory 408, one or more input devices 416, one or more output devices 418, a modem 424, and one or more display controllers 420, as examples. The input device(s) 416 can include any type of input device, including, but not limited to, input keys, switches, voice processors, etc. The output device(s) 418 can include any type of output device, including, but not limited to, audio, video, other visual indicators, etc. The modem 424 can be any device configured to allow exchange of data to and from a network 426. The network 426 can be any type of network, including, but not limited to, a wired or wireless network, a private or public network, a local area network (LAN), a wireless local area network (WLAN), a wide area network (WAN), a BLUETOOTH™ network, and the Internet. The modem 424 can be configured to support any type of communications protocol desired. The processor 402 may also be configured to access the display controller(s) 420 over the system bus 406 to control information sent to one or more displays 422. The display(s) 422 can include any type of display, including, but not limited to, a cathode ray tube (CRT), a liquid crystal display (LCD), a plasma display, etc.

The processor-based device 400 in FIG. 4 may include a set of instructions 428 that may be encoded with the reach-based explicit consumer naming model to be executed by the processor 402 for any application desired according to the instructions. The instructions 428 may be stored in the system memory 408, processor 402, and/or instruction cache 404 as examples of non-transitory computer-readable medium 430. The instructions 428 may also reside, completely or at least partially, within the system memory 408 and/or within the processor 402 during their execution. The instructions 428 may further be transmitted or received over the network 426 via the modem 424, such that the network 426 includes the computer-readable medium 430.

While the computer-readable medium 430 is shown in an exemplary embodiment to be a single medium, the term "computer-readable medium" should be taken to include a single medium or multiple media (e.g., a centralized or distributed database, and/or associated caches and servers) that store the one or more sets of instructions 428. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device comprising one or more processing elements (PEs) communicatively coupled to each other via an interconnect bus, each PE comprising:
   an execution pipeline comprising a memory access stage;
   an instruction cache; and
   a store-and-invalidate logic circuit;
   each PE configured to:
      receive, by the memory access stage of the execution pipeline, an indication to perform a store-and-invalidate operation, the indication comprising a store address and store data; and
      responsive to receiving the indication, atomically perform the store-and-invalidate operation by being configured to:
         write, using the store-and-invalidate logic circuit, the store data to a memory location indicated by the store address; and
         invalidate, using the store-and-invalidate logic circuit, an instruction cache line corresponding to the store address in the instruction cache;
      wherein the PE is configured to ensure that the store-and-invalidate operation is successfully completed only if both the write operation and the invalidate operation are successfully completed.

2. The processor-based device of claim 1, wherein the memory location indicated by the store address comprises one of a memory location indicated by the store address in a system memory and a unified cache line corresponding to the store address in a unified cache of the PE.

3. The processor-based device of claim 1, wherein:
   the processor-based device comprises a plurality of PEs;
   the store-and-invalidate logic circuit of each PE comprises:
      a bus command generator circuit; and
      a snoop decoder circuit;
   a first PE of the plurality of PEs is configured to issue, using the bus command generator circuit of the first PE, a store-and-invalidate bus command to the interconnect bus;
   the interconnect bus is configured to broadcast the store-and-invalidate bus command to one or more PEs among the plurality of PEs; and
   a second PE of the one or more PEs is configured to:
      receive, using the snoop decoder circuit of the second PE, the store-and-invalidate bus command from the interconnect bus; and
      invalidate, using the snoop decoder circuit of the second PE, an instruction cache line corresponding to the store address in an instruction cache of the second PE, responsive to receiving the store-and-invalidate bus command.

4. The processor-based device of claim 3, wherein the second PE is further configured to write, using the snoop decoder circuit of the second PE, the store data to a unified cache line corresponding to the store address in a unified cache of the second PE.

5. The processor-based device of claim 3, wherein the second PE is further configured to invalidate a unified cache line corresponding to the store address in a unified cache of the second PE.

6. The processor-based device of claim 3, wherein the first PE is configured to invalidate the instruction cache line corresponding to the store address in the instruction cache of the first PE responsive to receiving the store-and-invalidate bus command back from the interconnect bus.

7. The processor-based device of claim 3, wherein the interconnect bus is configured to broadcast the store-and-invalidate bus command to the one or more PEs responsive to determining that the one or more PEs potentially cache the store data.

8. The processor-based device of claim 1, further configured to send, by an execute stage of the execution pipeline, the indication to perform the store-and-invalidate operation to the memory access stage of the execution pipeline responsive to executing a store-and-invalidate instruction defined by an instruction set architecture (ISA) of the processor-based device.

9. The processor-based device of claim 1, wherein the indication to perform the store-and-invalidate operation comprises an indication from a page table of the PE that indicates that contents of the memory location indicated by the store address are executable.

10. A method for providing a store-and-invalidate operation, comprising:
   receiving, by a memory access stage of an execution pipeline of a processing element (PE) of one or more PEs of a processor-based device, an indication to perform a store-and-invalidate operation, the indication comprising a store address and store data; and responsive to receiving the indication, atomically performing the store-and-invalidate operation by:
writing, by a store-and-invalidate logic circuit of the PE, the store data to a memory location indicated by the store address; and
invalidating, by the store-and-invalidate logic circuit, an instruction cache line corresponding to the store address in an instruction cache of the PE;
wherein the store-and-invalidate operation is successfully completed only if both the write operation and the invalidate operation are successfully completed.

11. The method of claim 10, wherein the memory location indicated by the store address comprises one of a memory location indicated by the store address in a system memory and a unified cache line corresponding to the store address in a unified cache of the PE.

12. The method of claim 10, wherein:
the processor-based device comprises a plurality of PEs;
the PE is a first PE of the plurality of PEs;
the method further comprises issuing, by a bus command generator circuit of the store-and-invalidate logic circuit of the first PE, a store-and-invalidate bus command to an interconnect bus; and
atomically performing the store-and-invalidate operation further comprises:
broadcasting, by the interconnect bus, the store-and-invalidate bus command to one or more PEs among the plurality of PEs;
receiving, by a snoop decoder circuit of the store-and-invalidate logic circuit of a second PE of the one or more PEs, the store-and-invalidate bus command from the interconnect bus; and
invalidating, by the snoop decoder circuit of the second PE, an instruction cache line corresponding to the store address in an instruction cache of the second PE, responsive to receiving the store-and-invalidate bus command.

13. The method of claim 12, wherein atomically performing the store-and-invalidate operation further comprises writing, by the second PE, the store data to a unified cache line corresponding to the store address in a unified cache of the second PE.

14. The method of claim 12, wherein atomically performing the store-and-invalidate operation further comprises invalidating, by the second PE, a unified cache line corresponding to the store address in a unified cache of the second PE.

15. The method of claim 12, wherein invalidating the instruction cache line corresponding to the store address in the instruction cache of the first PE is responsive to receiving the store-and-invalidate bus command back from the interconnect bus.

16. The method of claim 12, wherein broadcasting the store-and-invalidate bus command to the one or more PEs is responsive to the interconnect bus determining that the one or more PEs potentially cache the store data.

17. The method of claim 10, further comprising sending, by an execution stage of the execution pipeline, the indication to perform the store-and-invalidate operation to the memory access stage of the execution pipeline responsive to executing a store-and-invalidate instruction defined by an instruction set architecture (ISA) of the processor-based device.

18. The method of claim 10, wherein the indication to perform the store-and-invalidate operation comprises an indication from a page table of the PE that indicates that contents of the memory location indicated by the store address are executable.

19. A non-transitory computer-readable medium having stored thereon computer-executable instructions which, when executed by a processor, cause the processor to:
receive an indication to perform a store-and-invalidate operation, the indication comprising a store address and store data; and
responsive to receiving the indication, atomically perform the store-and-invalidate operation by causing the processor to:
write the store data to a memory location indicated by the store address; and
invalidate an instruction cache line corresponding to the store address in an instruction cache of the processor;
wherein the store-and-invalidate operation is successfully completed only if both the write operation and the invalidate operation are successfully completed.

20. The non-transitory computer-readable medium of claim 19, wherein the memory location indicated by the store address comprises one of a memory location indicated by the store address in a system memory and a unified cache line corresponding to the store address in a unified cache.

* * * * *